US011925936B2

(12) United States Patent
Sager et al.

(10) Patent No.: US 11,925,936 B2
(45) Date of Patent: Mar. 12, 2024

(54) COMBINABLE CAVITY TRAY, ASSEMBLY OF COMBINABLE CAVITY TRAYS, METHOD OF MANUFACTURING AND USE OF A COMBINABLE CAVITY TRAY

(71) Applicant: TECAN TRADING AG, Mannedorf (CH)

(72) Inventors: Adrian Sager, Mannedorf (CH); Philipp Ott, Steg (CH)

(73) Assignee: TECAN TRADING AG, Mannedorf (CH)

(*) Notice: Subject to any disclaimer, the term of this patent is extended or adjusted under 35 U.S.C. 154(b) by 373 days.

(21) Appl. No.: 17/113,700

(22) Filed: Dec. 7, 2020

(65) Prior Publication Data

US 2021/0178400 A1 Jun. 17, 2021

(30) Foreign Application Priority Data

Dec. 11, 2019 (EP) .................................... 19215078

(51) Int. Cl.
*B01L 9/00* (2006.01)
*B01L 3/00* (2006.01)

(52) U.S. Cl.
CPC ............. *B01L 9/543* (2013.01); *B01L 3/5085* (2013.01); *B01L 2200/025* (2013.01); *B01L 2300/0829* (2013.01)

(58) Field of Classification Search
CPC .. B01L 9/543; B01L 3/5085; B01L 2200/025; B01L 2300/0829
See application file for complete search history.

(56) References Cited

U.S. PATENT DOCUMENTS

| | | | | | |
|---|---|---|---|---|---|
| 4,242,834 | A | * | 1/1981 | Olsen | A01G 9/0295 47/75 |
| 4,675,299 | A | | 6/1987 | Witty | |
| 5,000,921 | A | * | 3/1991 | Hanaway | B01L 3/021 422/522 |
| RE34,133 | E | * | 11/1992 | Thorne | B01L 3/50855 422/942 |
| 5,827,745 | A | | 10/1998 | Astle | |
| 10,258,992 | B2 | | 4/2019 | Curry et al. | |

(Continued)

FOREIGN PATENT DOCUMENTS

EP 1214977 A2 6/2002

OTHER PUBLICATIONS

European search report for corresponding European patent application No. 19215078.7, dated Jun. 8, 2020.

*Primary Examiner* — Jill A Warden
*Assistant Examiner* — Alex Ramirez
(74) *Attorney, Agent, or Firm* — Notaro, Michalos & Zaccaria P.C.

(57) ABSTRACT

A combinable cavity tray for liquid handling is provided. The combinable cavity tray has at least one cavity for receiving a fluid and at least one passage for leading through a cavity of a second combinable cavity tray and/or for connecting to a pipetting apparatus. The at least one cavity of the combinable cavity tray is formed integrally. An assembly of combinable cavity trays having at least two combinable cavity trays, a method of manufacturing a combinable cavity tray and the use of a combinable cavity tray or of an assembly of combinable cavity trays for liquid handling are provided.

13 Claims, 8 Drawing Sheets

(56) References Cited

U.S. PATENT DOCUMENTS

Figure 1A:
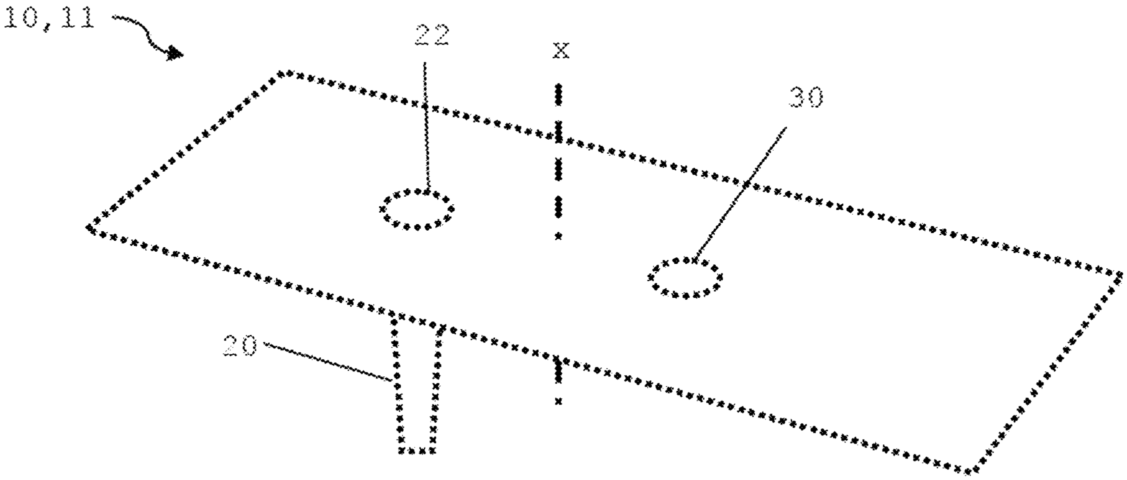

| | | | | | |
|---|---|---|---|---|---|
| 2010/0192813 | A1* | 8/2010 | Fry | B01L 3/50855 | |
| | | | | 414/800 | |
| 2015/0182968 | A1* | 7/2015 | Karpiloff | B01L 9/06 | |
| | | | | 422/562 | |

* cited by examiner

COMBINABLE CAVITY TRAY, ASSEMBLY OF COMBINABLE CAVITY TRAYS, METHOD OF MANUFACTURING AND USE OF A COMBINABLE CAVITY TRAY

The present invention relates to the technical field of liquid handling, in particular to consumables used for liquid handling, and is directed to a combinable cavity tray and an assembly of at least two combinable cavity trays. A further aspect of the invention is directed to a method of manufacturing a combinable cavity tray and the use of a combinable cavity tray or an assembly of combinable cavity trays for liquid handling.

Pipetting tips, such as disposable pipetting tips, are in general well known in the field of liquid handling and are normally provided in a tip tray to be inserted in a tip box. Each pipetting tip is individually and in a loose manner stuck in a corresponding opening of the tip tray and held therein, or rather stopped from sliding therethrough, by the at least partially conically shape of the pipetting tip and the size of the opening being smaller than the maximum cross-sectional area of the pipetting tip. The pipetting tips presented in the tip tray of a tip box are either removed individually and manually by inserting the pipetting tube of a manual pipetting device or removed machine-controlled, either individually or collectively, by inserting the pipetting tube(s) of the pipetting head of an automated liquid handling system or pipetting apparatus. A typical pipetting head of an automated liquid handling system comprises for instance 8, 12, 16, 24, 48, 96, 384 or 1536 pipetting tubes designed for attaching in a sealing manner a pipetting tip each thereto. Such automated liquid handling systems or pipetting apparatuses are for instance described in EP1214977. When the pipetting cycle is over, the pipetting tips are disposed and so are the tip trays used for storage, transportation, and presentation. Only the pipetting box may be reused causing a lot of waste.

Pipetting tips are normally made of polypropylene and their mass production is based on injection molding. Polypropylene granulate is first molten and the molten material is then injected into the individual cavities of a mold specifically made for the purpose of manufacturing pipetting tips. Once the material is solid again, or in other words sufficiently cool, the batch of pipetting tips is ejected. Each single and individual cavity allows to produce a single and individual pipetting tip.

Although common practice is rather successful, it shows several drawbacks. On the one hand, injection molding manufacturing technology needs expensive tools, namely the for each purpose individually tailored molds. On the other hand, the manufactured and individual pipetting tips must be stored in trays which are a in most cases also manufactured based on expensive injection molding manufacturing technology and represent a disposable good.

This results in a lot of plastic material usage having an impact on manufacturing, transporting and waste costs. However, the manufacturing costs are not only driven by the excessive amount of basic material required but also by the high initial costs for designing and manufacturing the mold for injection molding. The tools are expensive for several reasons, in particular because the tools must comprise a high number of cavities (e.g. 32, 64 or 96), require a high precision in steel, must resist high pressures and therefore be massive, require cooling channels in the drift pin for lower cycle times and require heating channels to allow for injection molding without sprue. Moreover, each produced tip must be tested by means of a complex automated system before being packed.

The more or less same observations apply to microplates, such as 96 well plates or alike. The essentially only difference is that the handling (such as packaging etc.) of microplates is easier compared to the handling of disposable pipetting tips as the wells of a microplate are provided in an association of multiple wells, i.e. as microplate, and not individually.

The object of the present invention is to provide less costly consumables.

This object is achieved by the combinable cavity tray according to claim 1, which allows for a less costly production of consumables and in addition reduces the amount of basic material required for production.

The combinable cavity tray for liquid handling according to the invention comprises at least one cavity for receiving a fluid and at least one passage for leading through a cavity of a second combinable cavity tray and/or for leading through a pipetting tube of a pipetting apparatus. The at least one cavity is in particular formed integrally.

Integrally in this respect means that the cavity is part of the combinable cavity tray and forms a fixed component. The cavities are in particular not designed or manufactured separately and then linked to the rest of the combinable cavity tray. In other words, the combinable cavity tray is in particular a one-piece-design.

The constitution of a combinable cavity tray according to the invention allows for forming an assembly of at least two combinable cavity trays that can be used similar to a microplate (also known as microtiter plate, microwell plate or multiwell) or to a plurality of disposable tips. This concept opens new ways of manufacturing, in particular the implantation of production methods other than injection molding. The renunciation of injection molding results in lower manufacturing costs driven by lower toll costs, i.e. no expensive injection molds are required anymore, lower manufacturing machine costs apply, and higher manufacturing capacities can be realized since more cavity trays can be produced at the same time in parallel. Furthermore, less basic material is required for production, thereby causing lower expenses on raw materials and a reduction of waste deposition and transportation costs. Overall, the use of consumable becomes more sustainable. Moreover, due to the lower production costs compared to conventional disposable pipetting tips made by injection molding, the combinable cavity tray and assemblies thereof can be sold to the consumer for less money and thus reduce the operation costs for a laboratory in general.

Another of the advantages of the combinable cavity trays according to the invention is that they provide for a high packing density and therefore require only little space on the worktable compared to e.g. conventional disposable tips presented in a tip box. However, it is not necessarily the case that the combinable cavity trays are positioned right from the start on the worktable itself, but they can also be stored behind the worktable or in a shelf. A gripper is then in charge to provide the combinable cavity trays and position them on the worktable. Nonetheless, the consumer benefits from the little storage space that is required by the combinable cavity trays. The at least one cavity is in particular suitable for handling liquids of liquid volumes between e.g. 10 μl to 10 ml. The overall volume of the cavity is e.g. between 10% to 50% larger as the cavity is not complete filed with liquid for liquid handling. The at least one cavity is in particular cylindric and/or conically shaped, comprising e.g. a diameter between 0.2 to 1.5 cm, in particular of 0.2 to 0.6 cm, and a depth of 0.5 to 10.0 cm, in particular of 1.0 to 5.0 cm. The opening of the at least one cavity is preferably round and comprises e.g. a diameter of 0.2 to 1.5 cm, in particular of 0.3 to 1.0 cm, further in particular of 0.6 cm. The passage, on the other hand, is also preferably round and comprises e.g. a diameter of 0.2 to 1.5 cm, in particular of 0.3 to 1.0 cm, further in particular 0.6 cm. In an example, the passage comprises a smaller diameter (e.g. smaller by 0.1, 0.2, 0.3, 0.4 or 0.5 cm) than the opening of a conically shaped cavity such that an upper combinable cavity tray is positioned higher than the combinable cavity tray of below by more than the material thickness of the edge of the passage. The main body of the combinable cavity tray is e.g. essentially rectangular and comprises e.g. a width of 4 to 20 cm and a length of 6 to 30 cm, in particular a width of 9 cm and a length of 13 cm. Typical cavity densities for a number of 2, 4, 6, 8, 12, 24, 48, 96, 384 or 1536 cavities per combinable cavity tray are therefore approximately 0.08, 0.17, 0.25, 0.33, 0.5, 1, 2, 4, 16 or 64 cavities per $cm^2$ for an area of 4 cm×6 cm. Further examples can easily be calculated by dividing the number of cavities of a combinable cavity tray by its area in $cm^2$.

In one embodiment of the combinable cavity tray according to the invention, which may be combined with any of the embodiments still to be addressed unless in contradiction, is the at least one cavity formed by thermoforming.

A typical thermoforming manufacturing process comprises the steps of heating a plastic sheet to a pliable forming temperature, forming the plastic sheet to a specific shape in a mold, cooling the plastic sheet to a desired shape, and trimming the desirably shaped plastic sheet to create a usable product. Although thermoforming requires molds such as injection molding, the molds are manifold cheaper than the ones for injection molding. However, thermoforming comes along with some process limitations. While forming the plastic sheet to a specific shape in a mold, the material of the initially planar plastic sheet is stretched in vertical direction, but the material can only tolerate a certain lengthening before tearing. This results in a general limitation of the depth of a 3D structure being maximum 4 times its width. To nonetheless provide a stable structure suitable for implementation together with a pipetting apparatus comprising a pipetting head of large numbers of pipetting tubes, such as e.g. 96, or for analyzing a large number of samples in a multitude of test tubes, the actual liquid handling is carried out on the basis of an assembly of at least two combinable cavity trays. Due to the smaller number of cavities in each of the combinable cavity trays compared to the assembly, the depth-to-width-ratio-limitation can be compensated, and a structure can be provided that comprises more cavities per area than could be provided based a one-piece-structure.

In one embodiment of the combinable cavity tray according to the invention, which may be combined with any of the preaddressed embodiments and any of the embodiments still to be addressed unless in contradiction, the combinable cavity tray is at least in parts of a thermosoftening plastic or a compound foil of thermosoftening plastic. Thermosoftening plastic are also considered as thermoplastic materials and comprise e.g. polyethylene terephthalate (PET), polystyrene (PS) or polypropylene (PP). The compound foils comprise or consist e.g. two of the above identified thermoplastic materials, in particular PET and PP. Other examples for thermoplastic materials are acrylonitrile butadiene styrene (ABS), polyamide (PA), polylactic acid (PLA), poly (methyl methacrylate) (PMMA), polycarbonate (PC), polyethylene (PE), polyether ether ketone (PEEK), polyvinyl chloride (PVC), celluloid. In one example, polyvinyl chloride (PVC) is explicitly excluded from the group of thermoplastic materials.

In one embodiment of the combinable cavity tray according to the invention, which may be combined with any of the preaddressed embodiments and any of the embodiments still to be addressed unless in contradiction, is the at least one cavity a pipetting cavity for aspirating and/or dispensing a fluid.

Such a combinable cavity tray is in particular suitable for the provision of an assembly of combinable cavity trays used as substitute for a multitude of single disposable tips in combination with a pipetting apparatus and its pipetting head. The pipetting cavity comprises an opening in the upper region for e.g. connecting to a pipetting tube of a pipetting head and an aperture in the bottom region for aspirating and/or dispensing a fluid. The aperture is e.g. round and comprises a diameter of 0.2 mm to 1.0 mm, in particular of 0.4 mm to 0.7 mm, further in particular of 0.5 mm.

In one embodiment of the combinable cavity tray according to the invention, which may be combined with any of the preaddressed embodiments and any of the embodiments still to be addressed unless in contradiction, is the at least one cavity a test tube for analytics and/or diagnostics.

Such a combinable cavity tray is in particular suitable for the provision of an assembly of combinable cavity trays used as substitute for a microplate comprising several wells, e.g. a 96-well plate. Opposite to a pipetting cavity, the test tube does not comprise an aperture in the bottom region for aspirating and/or dispensing a fluid. However, the test tube comprises also an opening in the upper region, but this opening is meant for adding and removing samples, chemicals and such.

In one embodiment of the combinable cavity tray according to the invention, which may be combined with any of the preaddressed embodiments and any of the embodiments still to be addressed unless in contradiction, comprises the combinable cavity tray at least one positioning means for guiding an assembling process of assembling a first cavity tray and a second cavity tray. It is also possible that the combinable cavity tray comprises, in addition or instead, at least one fixation means for fixing a first cavity tray and a second cavity tray when assembled.

The fixation means e.g. prevent the assembly from disassembling. Fixation means can be designed as two cooperating means, one being arranged at the first cavity tray and the other being arranged at the second cavity tray. The cooperating means can be configured as snap-on system, tongue-and-groove-joint, . . . . The positioning means assist the assembling process by guiding the combination of a first and second cavity tray. The positioning means may also be realized by cooperating means, e.g. by a protrusion being arranged at the first cavity tray and a recess being arranged at the second cavity tray.

In one embodiment of the combinable cavity tray according to the invention, which may be combined with any of the preaddressed embodiments and any of the embodiments still to be addressed unless in contradiction, comprises the combinable cavity tray n cavities. N is a natural number and calculated by dividing 96 by a natural number ≥2. N is in particular 48, 32, 24, 16, 12, 8, 6, 4, 3 or 2.

In one embodiment of the combinable cavity tray according to the invention, which may be combined with any of the preaddressed embodiments and any of the embodiments still to be addressed unless in contradiction, equals the number of cavities the numbers of passages.

In one embodiment of the combinable cavity tray according to the invention, which may be combined with any of the preaddressed embodiments and any of the embodiments still to be addressed unless in contradiction, is the number of cavities smaller than the number of passages. The number of cavities is in particular smaller by a factor, the factor being a natural number ≥2. The factor is e.g. 3, 4, 5, 6, 7, 8 or 9.

In one embodiment of the combinable cavity tray according to the invention, which may be combined with any of the preaddressed embodiments and any of the embodiments still to be addressed unless in contradiction, are the at least one cavity and at least one passage arranged alternating.

Such arrangement allows for the maximum compensation of the depth-to-width-ratio-limitation and is in particular recommended for combinable cavity trays comprising at least 2 cavities and one passage or at least two passages and one cavity.

In one embodiment of the combinable cavity tray according to the invention, which may be combined with any of the preaddressed embodiments and any of the embodiments still to be addressed unless in contradiction, comprise the combinable cavity tray a symmetry plane leading through at least one cavity and at least one passage The number of cavities and the number of passages where the symmetry plane leads through is identical.

Such a symmetry allows for assembling two identically designed combinable cavity trays (note: one of the combinable cavity trays must be rotated) and thus reduces the number of required tools for manufacturing the combinable cavity trays.

In one embodiment of the combinable cavity tray according to the invention, which may be combined with any of the preaddressed embodiments and any of the embodiments still to be addressed unless in contradiction, is the combinable cavity tray 180° rotationally asymmetric in reference to an axis orthogonal to the largest two-dimensional extent of the combinable cavity tray, rotationally asymmetric in the sense of cavities and passages interchanging positions when rotated.

Such an asymmetry allows for assembling two identically designed combinable cavity trays (note: one of the combinable cavity trays must be rotated) and thus reduces the number of required tools for manufacturing the combinable cavity trays.

A further aspect of the invention addresses an assembly of combinable cavity trays comprising at least two combinable cavity trays according to the invention.

In one embodiment of the assembly of combinable cavity trays according to the invention, which may be combined with any of the preaddressed embodiments and any of the embodiments still to be addressed unless in contradiction, is the total number of cavities 384, 96 or 48.

An even further aspect of the invention addresses a method of manufacturing a combinable cavity tray for liquid handling. The method comprises an in particular first step of providing a sheet of at least one thermosoftening plastic. Furthermore, the method comprises an in particular second step of shaping the sheet by thermoforming to comprise at least one cavity and an in particular third step of forming at least one passage into the sheet for leading through a cavity of a second combinable tip tray and/or for leading through a pipetting tube of a pipetting apparatus.

The step of shaping the sheet by thermoforming to comprise at least one cavity is in particular a single thermoforming process. There are two main types of thermoforming: vacuum forming and pressure forming, and both can be implemented in connection with the above described method. Vacuum forming uses heat and pressure to draw plastic sheets into its final configuration. Once a sheet is heated and placed over a mold, a vacuum is used to manipulate it into its desired shape. Pressure forming has many similarities to vacuum forming but has the added benefit of additional pressure. This pressure allows for greater detail and texture, making it a solid choice when aesthetics is an issue.

In one embodiment of the a method of manufacturing a combinable cavity tray for liquid handling according to the invention, which may be combined with any of the preaddressed embodiments and any of the embodiments still to be addressed unless in contradiction, comprises the method further the in particular fourth step of forming at least one aperture in the bottom area of the at least one cavity.

This step provides for a pipetting cavity for aspirating and/or dispensing a fluid. The aperture can e.g. be formed by laser techniques or die cutting.

In one embodiment of the a method of manufacturing a combinable cavity tray for liquid handling according to the invention, which may be combined with any of the preaddressed embodiments and any of the embodiments still to be addressed unless in contradiction, comprises the sheet a thickness of 0.3 to 1.0 mm, in particular of 0.5 to 0.8 mm, and further in particular of 0.7 mm.

An again further aspect of the invention addresses the use of a combinable cavity tray or of an assembly of combinable cavity trays for liquid handling, in particular for receiving a fluid and/or aspirating a fluid and/or dispensing a fluid.

Another further aspect of the invention addresses a method of connecting a combinable cavity tray or an assembly of combinable cavity trays to a pipetting apparatus with pipetting tubes. The method comprises an in particular first step of inserting at least one pipetting tube with its first end in a cavity of a combinable cavity tray through the opening of the cavity with a first force to achieve a friction fit between the at least one pipetting tube and the combinable cavity tray. The method comprises further an in particular second step of positioning the combinable cavity tray connected to the at least one pipetting tube on a rigid base and further inserting the at least one pipetting tube in the cavity with a second force being stronger than the first force to achieve a fluid-tight connection between the at least one pipetting tube and the cavity of the combinable cavity tray.

In an example, the second force is e.g. 300 N for a combinable cavity tray with 96 cavities or an assembly of combinable cavity trays with in total 96 cavities to achieve a fluid-tight connection between the pipetting tubes and the cavities. The first force for achieving a friction fit of a similar example is e.g. 50 N, 100 N or 150 N. The movement of the combinable cavity tray or assembly of combinable cavity trays necessary for the positioning on a rigid base can be driven by the pipetting apparatus.

Furthermore, an alternative method of connecting a combinable cavity tray or an assembly of combinable cavity trays to a pipetting apparatus with pipetting tubes is presented. The method comprises an in particular first step of inserting at least one pipetting tube with its first end in a cavity of a first combinable cavity tray through the opening of the cavity with a first force to achieve a friction fit between the at least one pipetting tube and the first combinable cavity tray. Furthermore, the method comprises an in particular second step of inserting at least one further pipetting tube with its first end in a cavity of a second combinable cavity tray through the opening of the cavity with a second force to achieve a friction fit between the at least one further pipetting tube and the second combinable cavity tray and an in particular third step of positioning the first combinable cavity tray connected to the at least one pipetting tube and the second combinable cavity tray connected to the at least one further pipetting tube on a rigid base and further inserting the at least one pipetting tube and the at least one further pipetting tube in the cavities with a third force being stronger than the first force and the second force to achieve a fluid-tight connection of the at least one pipetting tube and the at least one further pipetting tube to the cavities and to in particular achieve assembling the first combinable cavity tray and the second combinable cavity tray to form an assembly of combinable cavity trays.

The first and the second force can be equal or different, e.g. the first force can be stronger than the second force or the other way around. The movement of the first and second combinable cavity tray necessary for positioning them on a rigid base can be driven by the pipetting apparatus.

Figure 1B:
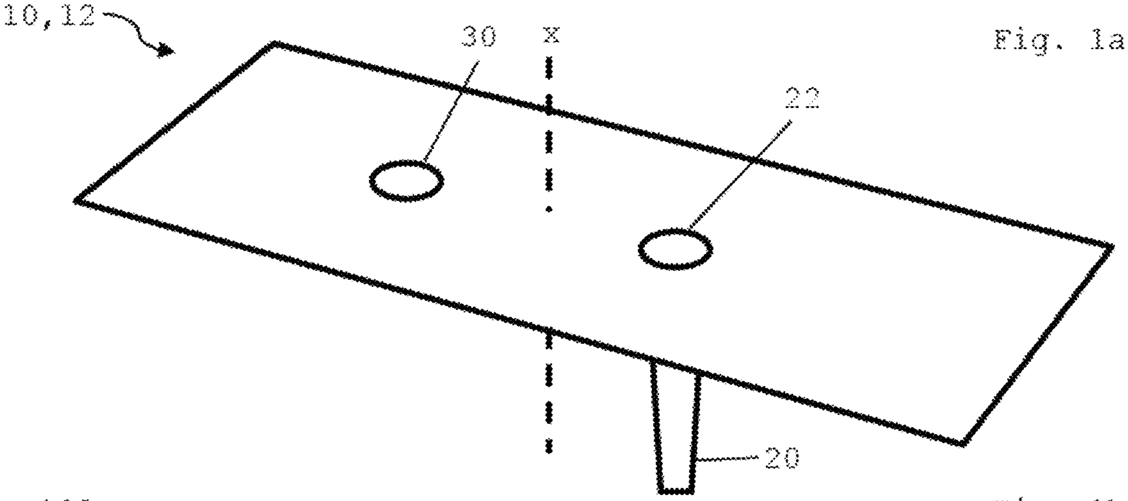
Figure 1C:
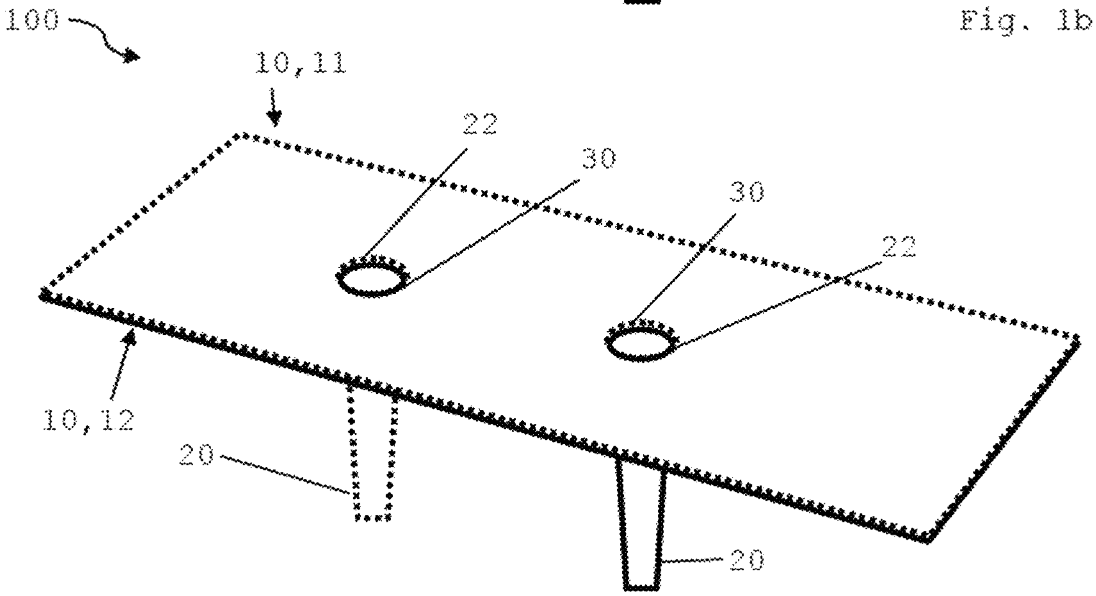
Figure 2A:
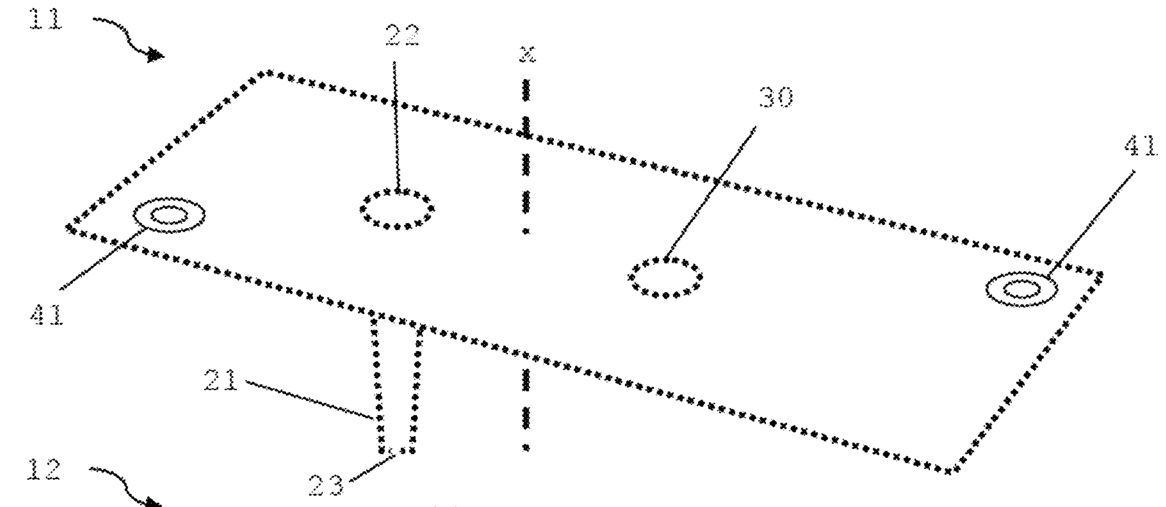
Figure 2B:
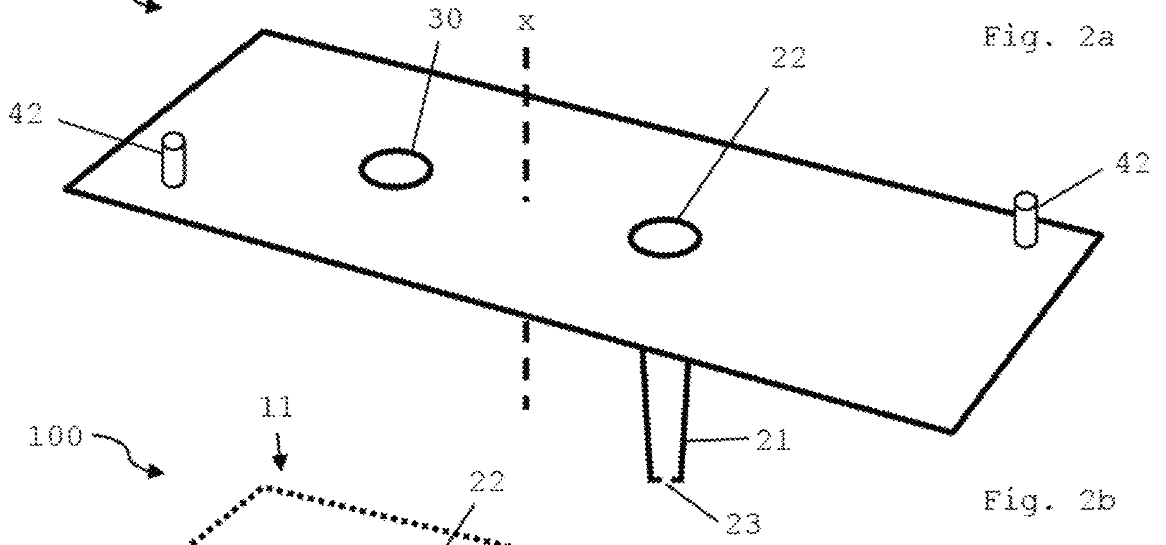
Figure 2C:
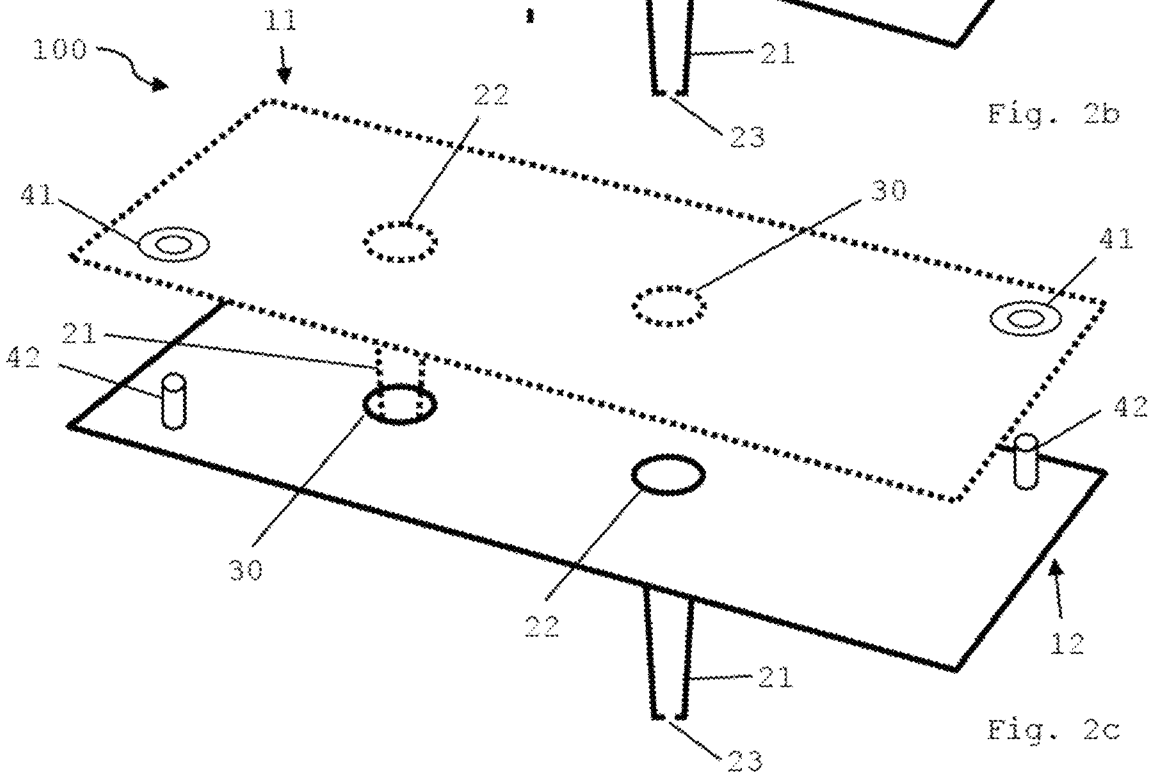
Figure 2D:
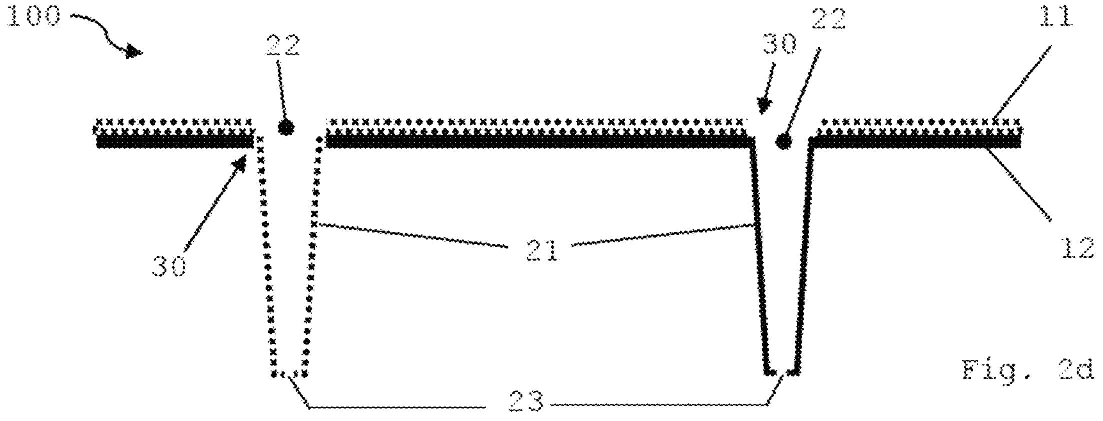

The invention shall now be further exemplified with the help of figures. The figures schematically show:

FIG. 1*a* an embodiment of a first combinable cavity tray according to the invention;

FIG. 1*b* an embodiment of a second combinable cavity tray according to the invention;

FIG. 1*c* an embodiment of an assembly of combinable cavity trays according to the invention;

FIG. 2*a* another embodiment of a first combinable cavity tray according to the invention;

FIG. 2*b* another embodiment of a second combinable cavity tray according to the invention;

FIG. 2*c* another embodiment of an assembly of combinable cavity trays according to the invention;

FIG. 2*d* a cross-sectional view of the assembly of combinable cavity trays of FIG. 2*c;*

Figure 3:
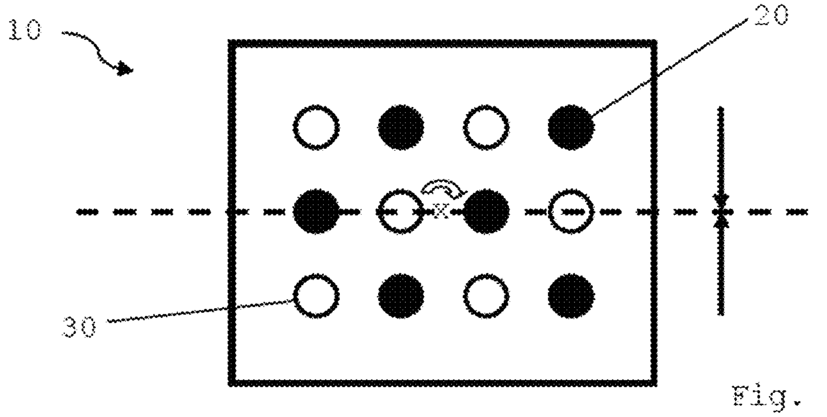
Figure 4:
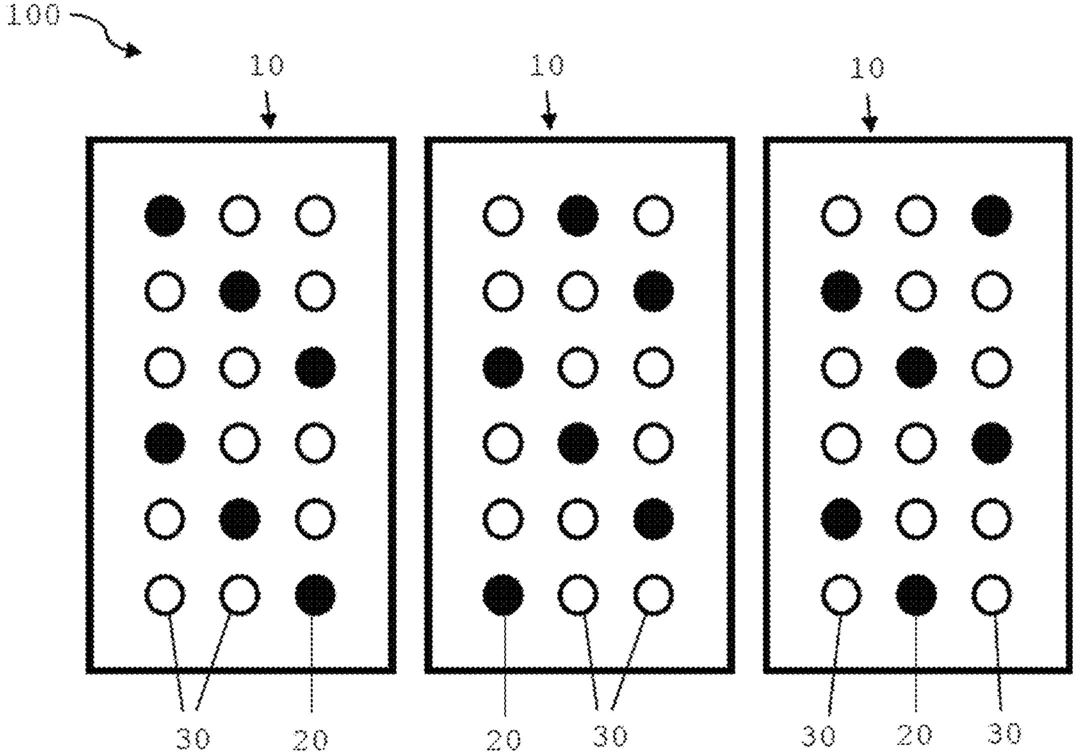
Figure 5:
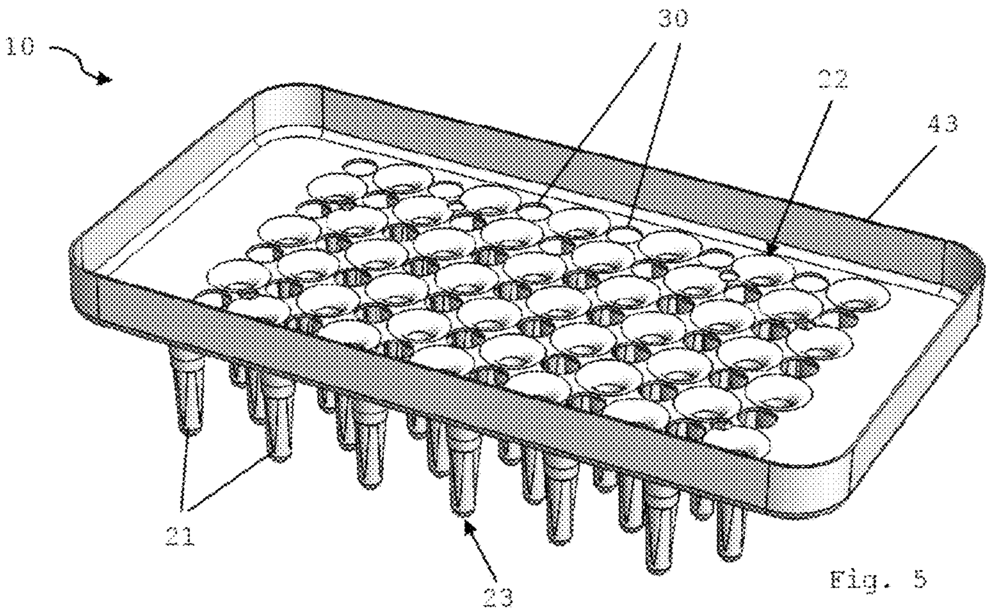
Figure 6A:
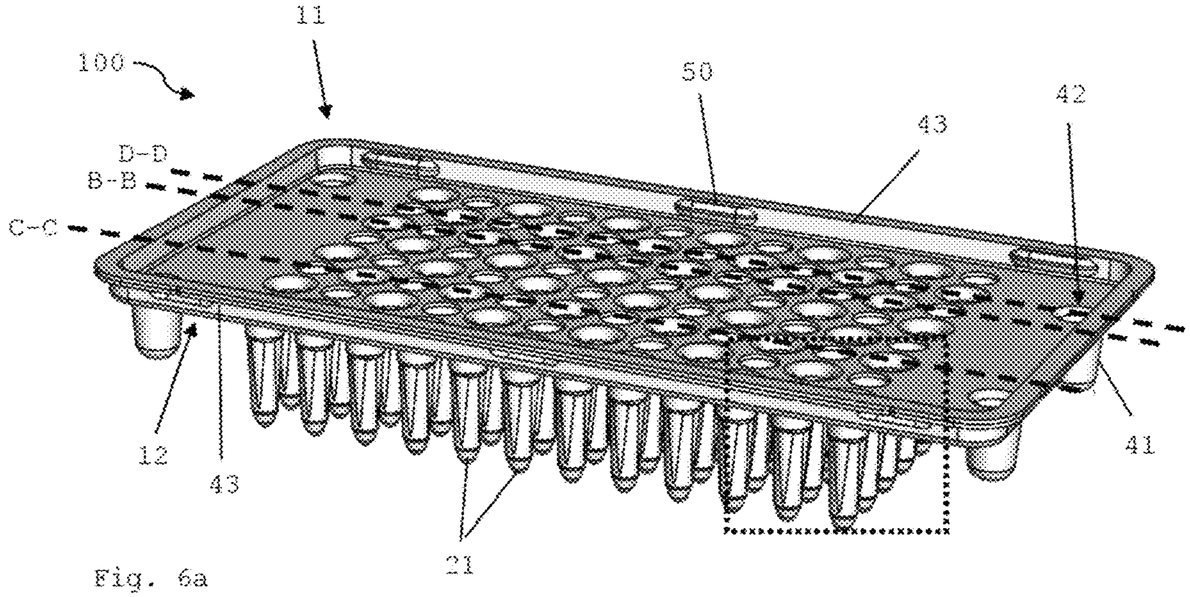
Figure 6B:
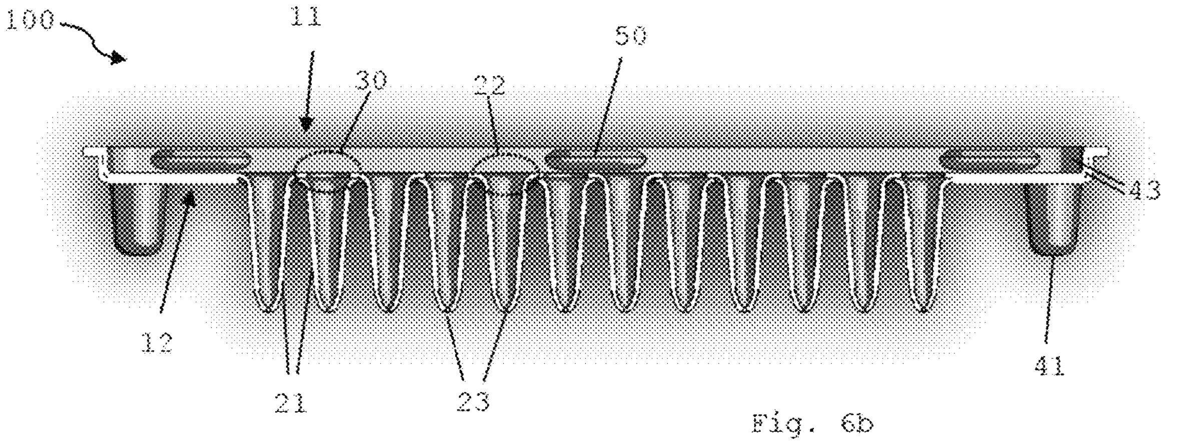

FIG. 3 a further embodiment of a combinable cavity tray according to the invention;

FIG. 4 a further embodiment of an assembly of combinable cavity trays according to the invention;

FIG. 5 a further embodiment of a combinable cavity tray according to the invention;

FIG. 6*a* a further embodiment of an assembly of combinable cavity trays according to the invention;

FIG. 6*b* a cross-sectional view of the assembly of combinable cavity trays of FIG. 6*a;*

Figure 6C:
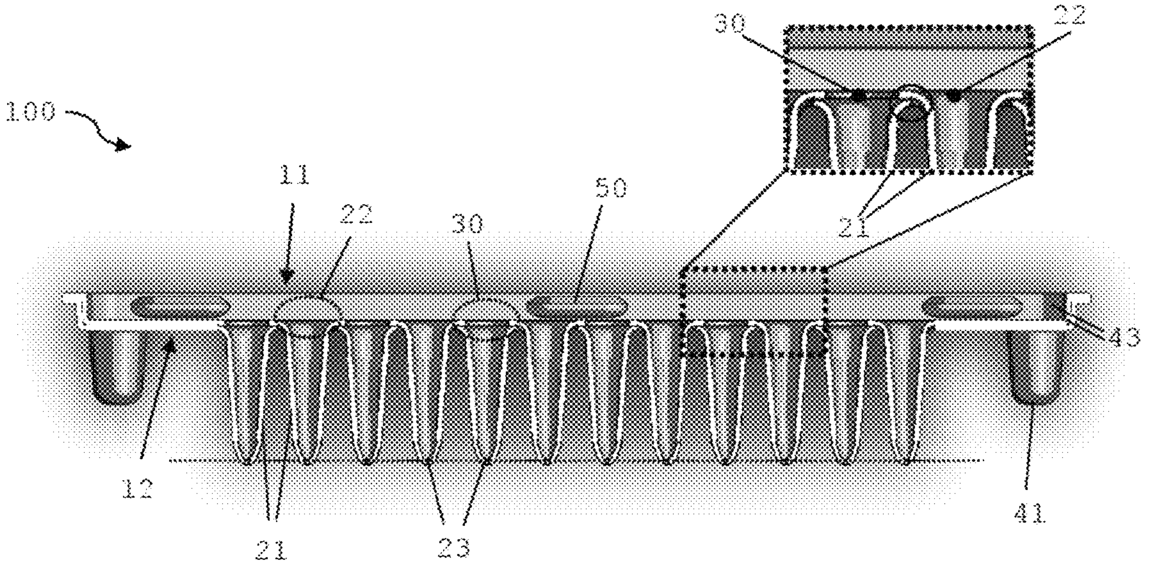

FIG. 6*c* a further cross-sectional view of the assembly of combinable cavity trays of FIG. 6*a;*

Figure 6D:
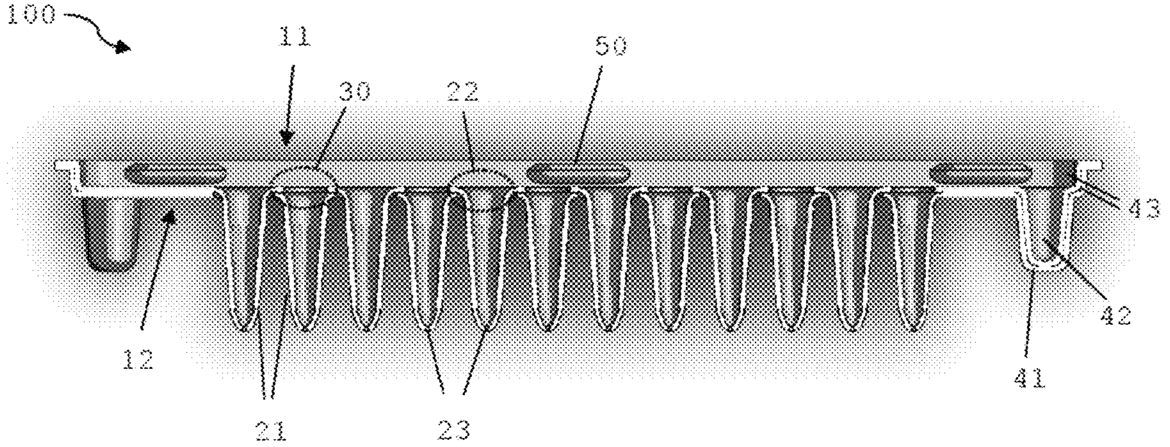

FIG. 6*d* a further cross-sectional view of the assembly of combinable cavity trays of FIG. 6*a;*

Figure 6E:
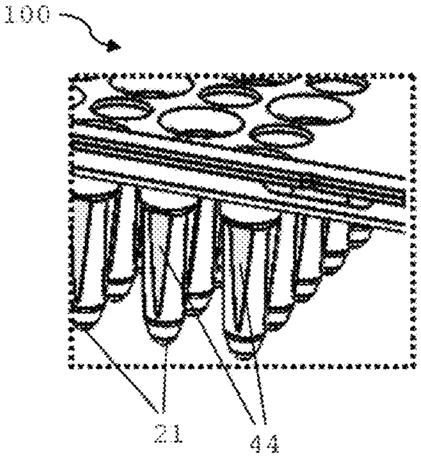

FIG. 6*e* an enlarged view of a cross-section of the assembly of combinable cavity trays of FIG. 6*a;*

Figure 7:
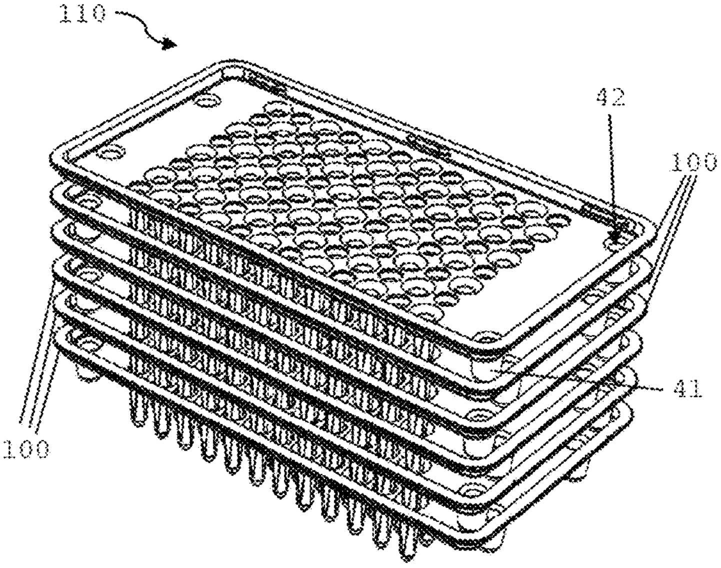
Figure 8A:
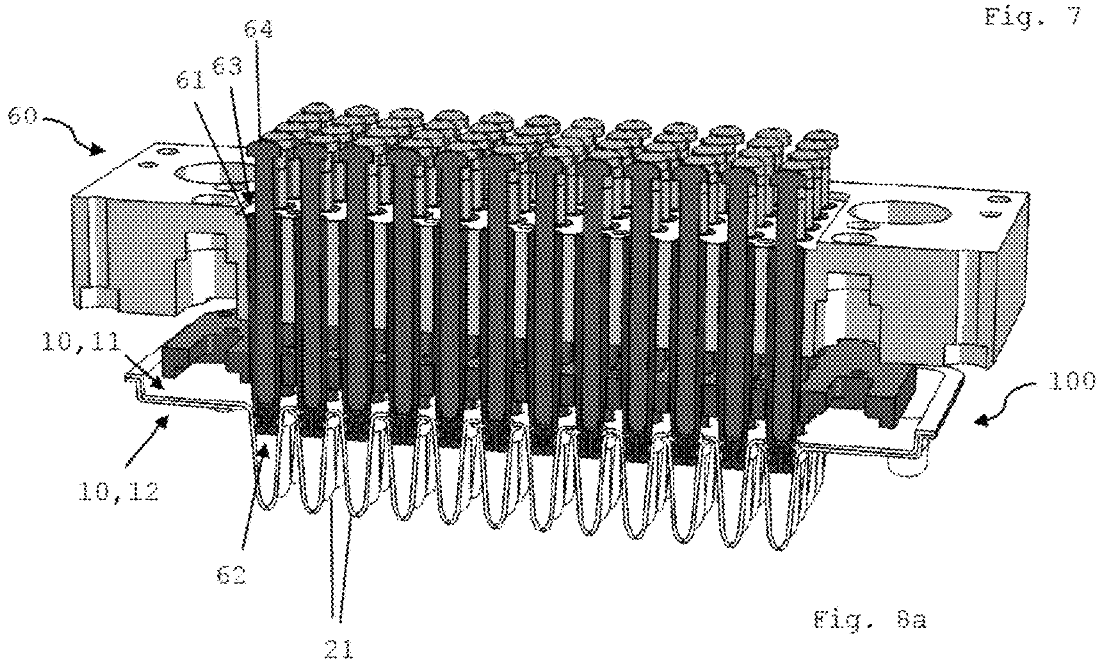
Figure 8B:
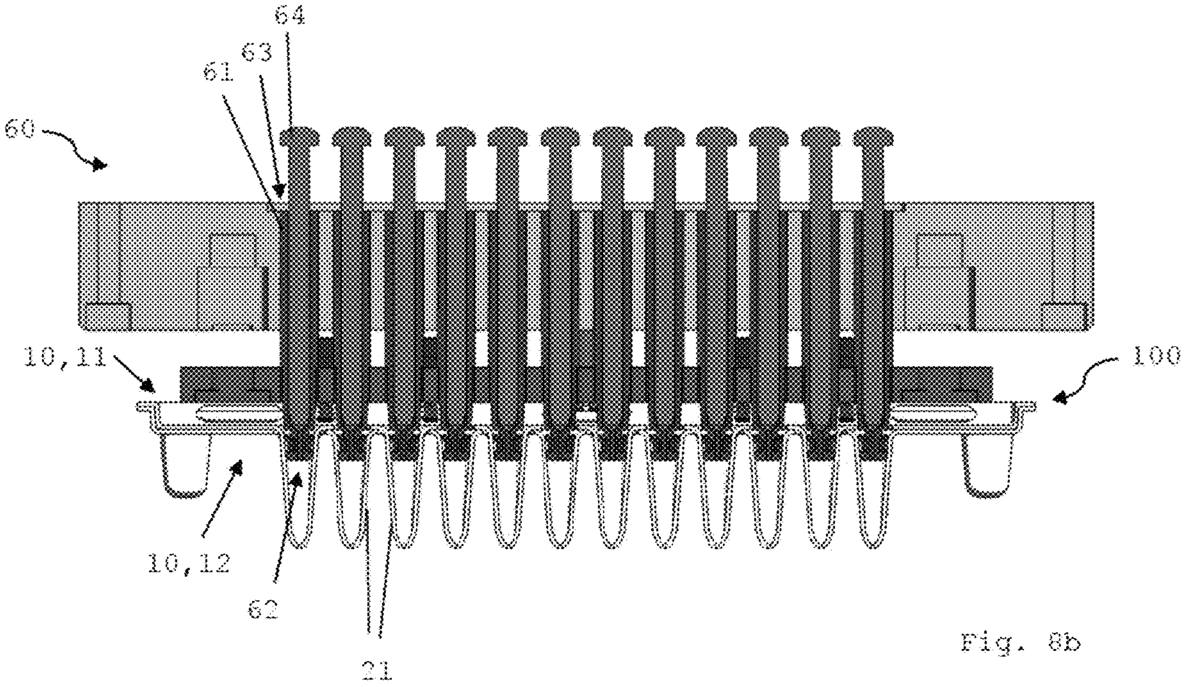

FIG. 7 a stack of several assemblies of combinable cavity trays according to the invention;

FIG. 8*a* an assembly of combinable cavity trays according to the invention connected to a multichannel pipetting head;

FIG. 8*b* a cross-sectional view of the assembly of combinable cavity trays connected to the multichannel pipetting head of FIG. 8*a;*

Figure 9:
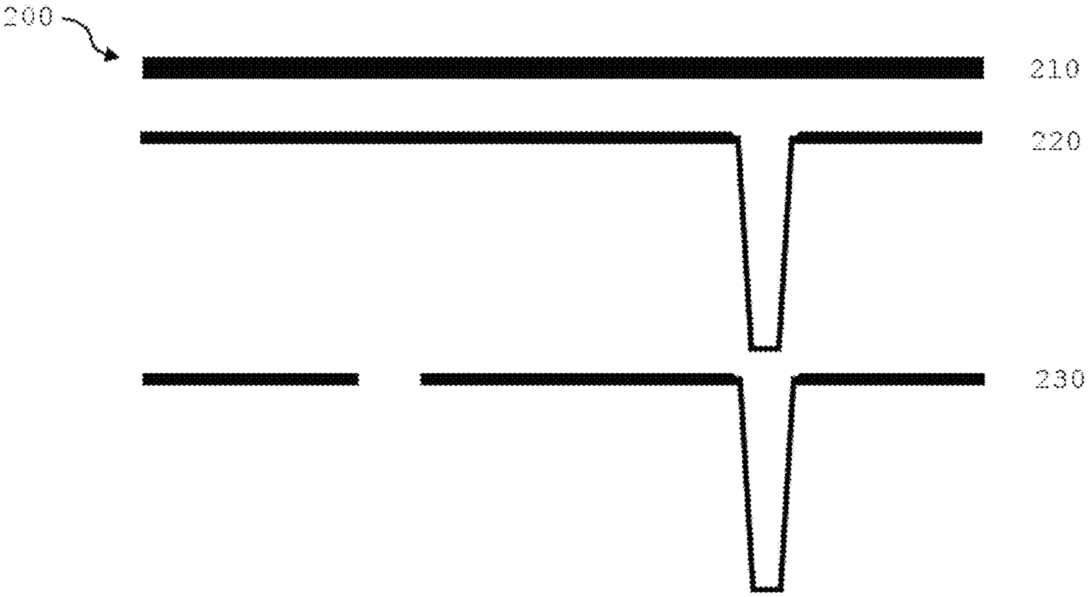
Figure 10:
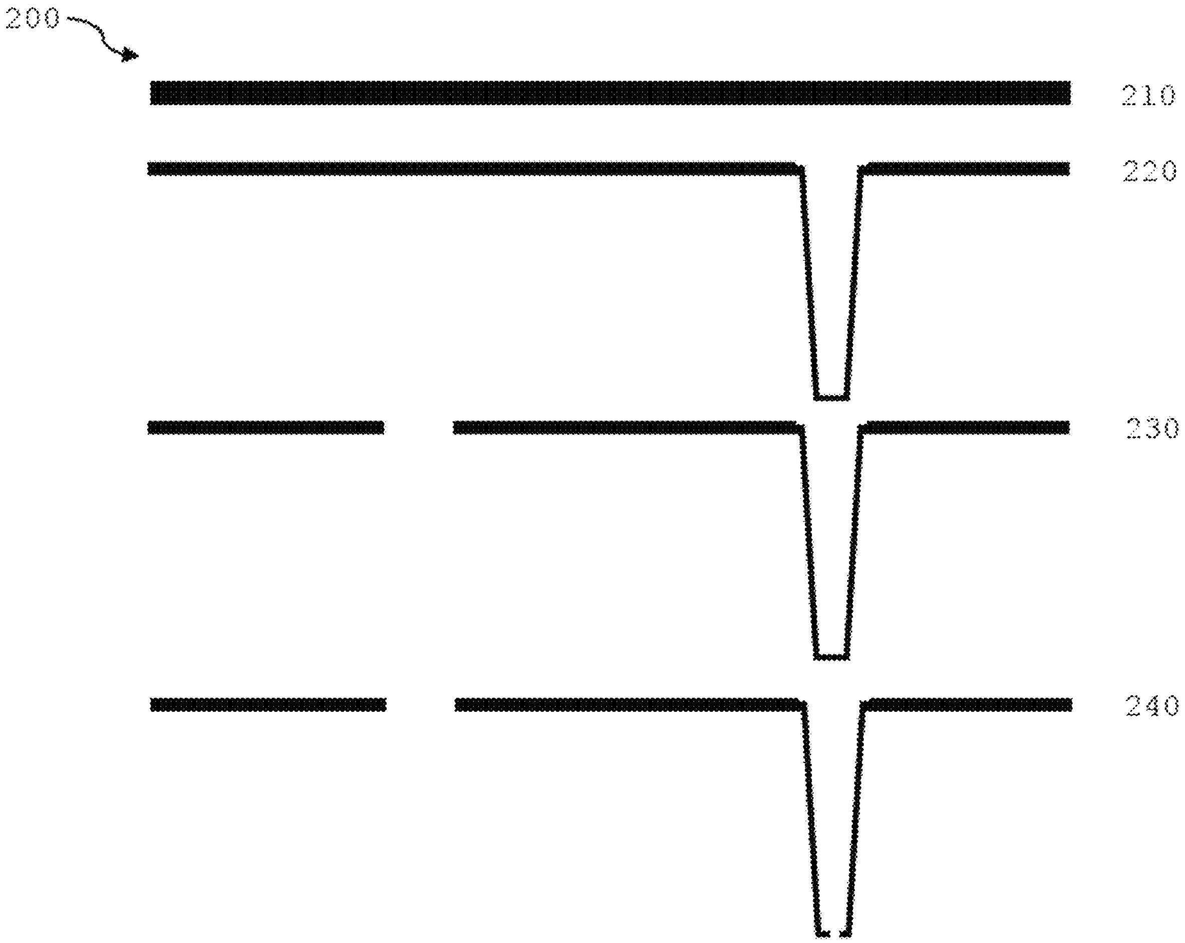

FIG. 9 an embodiment of a method of manufacturing a combinable cavity tray according to the invention; and FIG. 10 another embodiment of a method of manufacturing a combinable cavity tray according to the invention.

FIG. 1*a* shows a combinable cavity tray 10 for liquid handling. This combinable cavity tray 10 is called the first combinable cavity tray 11 (indicated by dashed lines) in the following and comprises one cavity 20 for receiving a fluid and furthermore one passage 30 for leading through a cavity of a second combinable cavity tray (e.g. a second combinable cavity tray as shown in FIG. 1*b*). The cavity 20 with its opening 22 is formed integrally such that the first combinable cavity tray 11, or at least its main body, and the cavity 20 are designed in one piece. The passage 30 is preferably at least as big as or even slightly bigger than the opening of the cavity of the second combinable cavity tray shown in FIG. 1*b*. The first combinable cavity tray 11, or at least its main body, is preferably made of a thermosoftening plastic (also known as thermoplastic material; e.g. polyethylene terephthalate (PET), polystyrene (PS) or polypropylene (PP)) or a compound foil comprising thermosoftening plastic(s), and the cavity 20 is preferably formed by a thermoforming process. The meaning of axis x becomes clear when studying FIG. 1*b* and its description.

FIG. 1*b* shows a combinable cavity tray 10 for liquid handling, e.g., by means of liquid handling systems. This combinable cavity tray 10 is called the second combinable cavity tray 12 (indicated by solid lines) in the following and is identical to the first combinable cavity tray shown in FIG. 1*a* but turned by 180° around an axis x being orthogonal to the largest two-dimensional extent of the second combinable cavity tip tray 12 such that, compared to the first combinable cavity tray shown in FIG. 1*a*, the passage 30 of the second combinable cavity tray 12 is located where the cavity of the first combinable cavity tray is and the cavity 20 with its opening 22 of the second combinable cavity tray 12 is located where the passage of the first combinable cavity tray is. One could say that the first combinable cavity tray and the second combinable cavity tray 12 are rotationally asymmetric such that cavity 20 and passage 30 interchanging positions when rotated around axis x by 180°.

FIG. 1*c* shows an assembly 100 of combinable cavity trays comprising the first combinable cavity tray 11 (indicated by dashed lines) of FIG. 1*a* and the second combinable tray 12 (indicated by solid lines) of FIG. 1*b*. The first combinable cavity tray 11 is put upon the second combinable tray 12 such that the cavity 20 of the first combinable cavity tray 11 points through the passage 30 of the second combinable tray 12 and the passage 30 of the first combinable cavity tray 11 is in alignment with the opening 22 of the cavity 20 of the second combinable tray 12. The assembly is now ready to be used in a manner similar to a one-piece cavity tray comprising two cavities but no passage. The shown assembly can for instance be used as a two-well microplate for analytics and/or diagnostics.

FIG. 2*a* shows a first combinable cavity tray 11 for liquid handling, in particular by means of liquid handling systems. The first combinable cavity tray 11 (indicated by dashed lines) comprises one passage 30 for leading through a cavity of a second combinable cavity tray (e.g. as shown in FIG. 2*b*) and furthermore one pipetting cavity 21 for aspirating and/or dispensing a fluid. The pipetting cavity 21 comprises an opening 22 on the top side and at least one aperture 23 on the bottom side. The pipetting cavity 21 is formed integrally such that the first combinable cavity tray 11, or at least its main body, and the pipetting cavity 21 are designed in one piece. The passage 30 is preferably at least as big as or even slightly bigger than the opening of the pipetting cavity of the second combinable cavity tray shown in FIG. 2*b*. The first combinable cavity tray 11, or at least its main body, is preferably made of a thermosoftening plastic (also known as thermoplastic material; e.g. polyethylene terephthalate (PET), polystyrene (PS) or polypropylene (PP)) or a compound foil comprising thermosoftening plastic(s), and the cavity for forming the pipetting cavity 21 is preferably formed by a thermoforming process. The first combinable cavity tray 11 comprises two female positioning means 41 for guiding an assembling process of fitting together a first combinable cavity tray and a second combinable cavity tray, the female positioning means 41 being arranged in opposite and non-neighbouring corners of the largest two-dimensional extent of the first combinable cavity tray 11. The meaning of axis x becomes clear when studying FIG. 2*b* and its description.

FIG. 2*b* shows a second combinable cavity tray 12 for liquid handling, in particular by means of liquid handling systems. The second combinable cavity tray 12 (indicated by solid lines) is designed comparable to the first combinable cavity tray shown in FIG. 2*a*, in particular in reference to the pipetting cavity 21 with its opening 22 and aperture(s) 23 and the passage 30. The first combinable cavity tray and the second combinable cavity tray 12 are rotationally asymmetric in relation to the position of the pipetting cavity 21 and the passage 30 in the sense that pipetting cavity 21 and passage 30 interchange positions when rotated around axis x by 180°, axis x being orthogonal to the largest two-dimensional extent of the second combinable cavity tray 12. However, the second combinable cavity tray 12 comprises two male positioning means 42 instead of two female positioning means, the male positioning means 42 being arranged such in opposite and non-neighbouring corners of the largest two-dimensional extent of the second combinable cavity tray 12 that they can be brought into alignment with the female positioning means of the first combinable cavity tray shown in FIG. 2*b*.

FIG. 2*c* shows an assembly 100 of combinable cavity trays comprising the first combinable cavity tray 11 (indicated by dashed lines) of FIG. 2*a* and the second combinable tray 12 (indicated by solid lines) of FIG. 2*b*. The first combinable cavity tray 11 is in the process of being put upon the second combinable cavity tray 12. The pipetting cavity 21 of the first combinable cavity tray 11 points already partially through the passage 30 of the second combinable tray 12 and the passage 30 of the first combinable cavity tray 11 is on its way to be brought into alignment with the opening 22 of the pipetting cavity 21 of the second combinable tray 12. Furthermore, the female positioning means 41 of the first combinable cavity tray 11 and the male positioning means 42 of the second combinable cavity tray 12 are oriented such that they serve as guiding elements for the last section of the assembling process. The male positioning means 42 and female positioning means 41 can be designed such that they form in addition fixation means, e.g. based on a snap-on engagement, for coupling the first cavity tray 11 and the second cavity tray 12. When joined completely, the assembly is ready to be used in a manner similar to a one-piece cavity tray comprising two cavities but no passage.

Please note that although the passage 30 of the first combinable cavity tray 11 is suitable for leading through a pipetting cavity of a second combinable cavity tray 12, there is no pipetting cavity 21 of a second combinable cavity tray 12 led through as the first combinable cavity tray 11 is the top-most combinable cavity tray and therefore its passage 30 is used to lead though a pipetting tube of a pipetting apparatus (not shown), e.g. a pipetting apparatus with a multichannel pipetting head, and thus the passage 30 is not only suitable for leading through a pipetting cavity 21 of a second combinable cavity tray 12 but also for leading through a pipetting tube of a pipetting apparatus. It is, of course, possible to design a combinable cavity tray whose passage is in particular specifically configured to lead through a pipetting tube of a pipetting apparatus and use this combinable cavity tray in particular as top-most combinable cavity tray in an assembly of cavity trays.

FIG. 2*d* shows a cross sectional view of the assembly 100 of combinable cavity trays of FIG. 2*c* in completely joined or assembled state. The cross section is drawn along a symmetry plane leading through the one pipetting cavity 21 and the one passage 30 of both the first combinable cavity tray 11 and the second combinable cavity tray 12, respectively. The first combinable cavity tray 11 is positioned upon the second combinable cavity tray 12 such that the pipetting cavity 21 of the first combinable cavity tray 11 pushes through the passage 30 of the second combinable tray 12 and the passage 30 of the first combinable cavity tray 11 is brought into alignment with the opening 22 of the pipetting cavity 21 of the second combinable tray 12. Both pipetting cavities 21 comprise an aperture 23.

FIG. 3 shows a top view on a combinable cavity tray 10 for liquid handling. The combinable cavity tray 10 comprises six cavities 20 (indicated by black circles) and six passages 30 (indicated by white circles) such that the number of cavities 20 equals the number of passages 30. The cavities 20 and passages 30 of the combinable cavity tray 10 are arranged alternating in a 4×3 matrix such that cavities 20, when viewed in column (four columns in total) or in row (three rows in total), are always arranged next to a passage 30 and not next to another cavity 20. The combinable cavity tray 10 is designed rotationally asymmetric such that cavity 20 and passage 30 interchange positions when the combinable cavity tray 10 is rotated by 180° around axis x. Axis x is orthogonal to the largest two-dimensional extent of the combinable cavity tip tray 10 and in this example also centric. Furthermore, the combinable cavity tray 10 comprises a symmetry plane (indicated by the dashed lines) leading through the two cavities 20 and the two passages 30 of the middle row. The advantage of such a mirror symmetry (visualized by the two arrows on the right-hand side) is that the combinable cavity tray 10 can be used as first combinable cavity tray and, when turned by 180° around axis x, as second combinable cavity tray in an arrangement of e.g. two combinable cavity trays.

FIG. 4 shows an assembly 100 of combinable cavity trays comprising three individual combinable cavity trays 10. The cavities 20 (indicated by black circles) and passages 30 (indicated by white circles) of the combinable cavity trays 10 are arranged in a 3×6 matrix. Each combinable cavity tray 10 comprises six cavities 20 and twelve passages 30 such that the number of cavities 20 is smaller than the number of passages 30 by a factor of two. Each of the in total 6 rows comprise one cavity 20 and two passages 30. Each of the in total 3 columns comprise two cavities 20 and four passages 30. The cavities 20 of the same column are arranged such that they are never in immediate vicinity but such that there is at least one, or preferably two, passage(s) in between. The more evenly the cavities 20 of a combinable cavity trays 10 are distributed, the more stable is the structure of the combinable cavity trays 10. Another benefit of evenly distributing the cavities 20 is that there is more material present for forming the cavities in a thermoforming process such that the cavities 20 can comprise a larger depth and therefore also a larger volume.

FIG. 5 shows a perspective view of a combinable cavity tray 10. The pipetting cavities 21 and the passages 30 are arranged in an 8×12 matrix. The pipetting cavities 21 and passages 30 are arranged alternating in relation to both their arrangement in row (in total twelve) and in column (in total eight). In consequence, when viewed in column or in row, a pipetting cavity 21 is always in direct vicinity to a passage 30 but never in direct vicinity to another pipetting cavity 21. The pipetting cavities 21 are formed integrally such that the combinable cavity tray 10, or at least its main body, and the pipetting cavities 21 are designed in one piece. The combinable cavity tray 10, or at least its main body, is preferably made of a thermosoftening plastic (also known as thermoplastic material; e.g. polyethylene terephthalate (PET), polystyrene (PS) or polypropylene (PP)) or a compound foil comprising thermosoftening plastic(s), and the cavities for forming the pipetting cavities 21 are preferably formed by a thermoforming process. The combinable cavity tray 10 comprises a positioning means designed as a positioning rim 43 surrounding the main body of the combinable cavity tray 10 and providing for a guiding assistance when e.g. putting a second combinable cavity tray (not shown) onto the combinable cavity tray 10 or inserting a second combinable cavity tray (not shown) into the combinable cavity tray 10. However, such a positioning rim 43 may not only serve as positioning support but also for stabilizing the combinable cavity tray 10 and/or for providing an interface to a gripper of a liquid handling system. The pipetting cavities 21 of the shown combinable cavity tray 10 comprise a conical shape with the opening 22 showing the largest cross-sectional area and the bottom part of the pipetting cavity 21 comprising the aperture 23 showing the smallest cross-sectional area. In the shown example, the opening 22 of the pipetting cavities 21 is larger than the size of the passages 30. Nonetheless, the predominant section of the pipetting cavities 21 comprises a cross-sectional area being small enough to fit through the cavities 30 of a comparably designed further combinable cavity tray.

FIG. 6*a* shows a perspective view of an assembly 100 of a first combinable cavity tray 11 and a second combinable cavity tray 12. Both combinable cavity trays 11, 12 comprise 48 pipetting cavities 21 and 48 passages 30 each being arranged in an 8×12 matrix. The pipetting cavities 21 and passages 30 are arranged alternating in relation to both their arrangement in row and in column. However, the position of the pipetting cavities 21 and the passages 30 of the first combinable cavity tray 11 and the second combinable cavity tray 12 are defined complementary such that the first combinable cavity tray 11 shows a pipetting cavity 21 where the second combinable cavity tray 12 shows a passage 30. Furthermore, the combinable cavity trays 11, 12 of the arrangement 100 comprise various interacting positioning means and/or interacting fixation means 50. The second combinable cavity tray 12, for instance, comprises a female positioning means 41 in each of its four corners designed as a positioning cavity. The first combinable cavity tray 11, on the other hand, comprises a male positioning means 42 in each of its four corners designed as a positioning protrusion configured to interact with the female position means 41 of the second combinable cavity tray 12. Furthermore, both combinable cavity trays 11, 12 comprise a positioning rim 43 surrounding the main body of the combinable cavity trays 11, 12. The positioning rim 43 of the first combinable cavity tray 11 is slightly smaller in its circumference such that it can be positioned within the circumference of the positioning rim 43 of the second combinable cavity tray 12. Even further, the combinable cavity trays 11, 12 comprise in total six fixation means 50 along the inside of the positioning frames 43 (only one indicated by reference number 50) for strongly or even irreversibly coupling the combinable cavity trays 11, 12 of the assembly 100. The dashed line B-B indicates the cutting line for the sectional view of FIG. 6*b*, the dashed line C-C indicates the cutting line for the sectional view of FIG. 6*c* and the dashed line D-D indicates the cutting line for the sectional view of FIG. 6*d*. The dashed rectangle indicates the section of the assembly 100 shown in FIG. 6*e* as enlarged view.

FIG. 6*b* shows a sectional view along cutting line B-B of the assembly 100 of combinable cavity trays of FIG. 6*a* with its first combinable cavity tray 11 and its second combinable cavity tray 12. Well visible are the pipetting cavities 21 with their apertures 23 and openings 22, as well as the passages 30 and the positioning frames 43 of the first and second combinable cavity trays 11, 12. Furthermore, two of the female positioning means 41 and three of the interacting fixation means 50 are shown in side view.

FIG. 6*c* shows a sectional view along cutting line C-C of the assembly 100 of combinable cavity trays of FIG. 6*a* with its first combinable cavity tray 11 and its second combinable cavity tray 12. Well visible are the pipetting cavities 21 with their apertures 23 and openings 22, as well as the passages 30 and the positioning frames 43 of the first and second combinable cavity trays 11, 12. Compared to the sectional view of FIG. 6*b*, the openings 22 and passages 30 have interchanged places. Furthermore, two of the female positioning means 41 and three of the interacting fixation means 50 are shown in side view.

By means of FIG. 6*c* it is explained that the pipetting cavities 21 of the first and the second combinable cavity tray 11, 12 are designed differently such that—in assembled state—all endings of the pipetting cavities 21 are at the same height or in other words on the same level (level or height indicated as dashed line). When taking a closer look at the enlarged sectional view indicated by the dashed-lined rectangle, it becomes clear that the pipetting cavity 21 with its opening 22 of the first combinable cavity tray 11 protrudes through the passage (not labeled) of the second combinable cavity tray 12 and that the edge of the opening 22 of the pipetting cavity 21 of the first combinable cavity tray 11 rests upon the edge of the passage 30 of the second combinable cavity tray 12 (see e.g. circled area of the enlarged view). The first combinable cavity tray 11 being the top combinable cavity tray in this example is therefore positioned higher than the second combinable cavity tray 12 by the material thickness of the edge of the passage 30 of the second combinable cavity tray 12. In order to provide for endings of the pipetting cavities 21 of the first and the second combinable cavity tray 11, 12 at the same level, the pipetting cavities 21 of the first—or in other words top—combinable cavity tray 11 are longer than the pipetting cavities 21 of the second—or in other words bottom or subjacent—combinable cavity tray 12 by the thickness of the material surrounding the passages 30 of the combinable cavity tray 12.

FIG. 6*d* shows a sectional view along cutting line D-D of the assembly 100 of combinable cavity trays of FIG. 6*a* with its first combinable cavity tray 11 and its second combinable cavity tray 12. Well visible are the pipetting cavities 21 with their apertures 23 and openings 22, as well as the passages 30 and the positioning frames 43 of the first and second combinable cavity trays 11, 12. The position of the openings 22 and passages 30 is comparable to the one shown in the sectional view of FIG. 6*b*. However, the cutting line D-D goes not only through the pipetting cavities 21 of the first and second combinable cavity tray 11, 12 but also through one of the female positioning means 41 and one of the male positioning means 42 interact with said female position means 41. Another of the female positioning means 41 and three of the interacting fixation means 50 are shown in side view. The sectional view as shown makes clear that the female and male positioning means 41, 42 are not distributed symmetrically in the four corners but that the neighboring female and male positioning means 41, 42 on the right-hand side are closer to each other and therefore further away from the positioning frames 43 as the neighboring female and male positioning means 41, 42 on the left-hand side (please also consult FIG. 6*a*). Of course, this different spacing between the neighboring positioning means of opposite sides of the combinable cavity trays is not restricted to what is considered the left-hand side and right-hand side of the combinable cavity trays here. For further information, please consult FIG. 7.

FIG. 6*e* shows an enlarged view of a section of the assembly 100 of combinable cavity trays of FIG. 6*a*. At least a part of the pipetting cavities 21 of the combinable cavity trays of the assembly 100 comprise reinforcing means 44 designed as strengthening ribs that e.g. comprise an essentially trigonal shape. These strengthening ribs can for instance be designed as bulges providing not only for additional strength of the pipetting cavities 21 but also for an enlargement of the volume for receiving fluid of the pipetting cavities 21.

FIG. 7 shows a stack 110 of several assemblies 100 of combinable cavity trays according to the invention. What has already been described in connection with FIG. 6*d* is further exemplified now. It is the different spacing between neighboring positioning means 41, 42 of opposite sides of the combinable cavity trays that allow the single combinable cavity trays, or in this example, the single assemblies 100 of combinable cavity trays to be stacked on top of each other when each second single combinable cavity tray, or in this example, each single second assembly 100 of combinable cavity trays of a stack 110 are rotated by 180° (e.g. around axis X as indicated in FIG. 1*a*, 1*b*, 2*a*, 2*b*, 3). The female positioning means 41, or in particular the depth of the female positioning means 41, defines the distance between the single combinable cavity trays, or in this example, the distance between the single assemblies 100 of combinable cavity trays in the stack 110. Said distance allows a gripper to pick up a combinable cavity tray or assembly 100 of cavity trays from the stack 110. Furthermore, the female positioning means 41 prevent the single combinable cavity trays or single assemblies 100 of combinable cavity trays from sticking together when stacked.

FIG. 8*a* shows an assembly 100 of combinable cavity trays 10 according to the invention connected to a multichannel pipetting head 60 of a pipetting apparatus (whole pipetting apparatus not shown). FIG. 8*b* shows a cross-sectional view thereof. The assembly 100 comprises a first combinable cavity tray 11 and a second combinable cavity tray 12, the assembly 100 being designed e.g. like the one shown in FIG. 6*a*. The multichannel pipetting head 60 comprises pipetting tubes 61 having a first end 62 provided with an opening for aspirating and/or dispensing of a sample fluid and a second end 63 operationally connected to a pressure generating means. The pressure in this example is transferred by plungers 64. The first ends 62 are configured to connect to the assembly 100 by partially entering the upper region of the pipetting cavities 21. The first ends 62 preferably comprise a conical shape further supporting a friction fit of a couple consisting of a pipetting cavity 21 and a first end 62 of a pipetting tube 61. In order to achieve a fluid-tight, or in other words sealing, connection between pipetting tube 61 and pipetting cavity 21, the first end 62 of the pipetting tube 61 shall be inserted in the upper region of the pipetting cavity 21 with a certain force. However, in case this certain force is rather strong, the connecting process would rather squeeze the stack providing the assembly 100 to be taken up than connecting in a sealing manner pipetting tubes 61 and pipetting cavities 21. To prevent any squeezing, the assembly 100 can be taken up in two steps. In a first step, the first ends 62 of the pipetting tubes 61 are inserted in the upper region of the pipetting cavities 21 with little force but enough force to lift the top-most assembly 100 from the stack and provide for a friction fit. In a second step, the lifted assembly 100 is moved towards and set upon a solid base or support plate, such as a tip box. The first ends 62 of the pipetting tubes 61 are then inserted further with more force than in the first step to achieve a fluid-tight connection. The first ends 62 of the pipetting tubes 61 may comprise sealing means such as a rubber O-ring seal or alike.

FIG. 9 shows a method of manufacturing 200 a combinable cavity tray. The method comprises a first step of providing a sheet of at least one thermosoftening plastic 210. In a second step, the sheet is shaped by thermoforming 220 to form at least one cavity. In a third step, at least one passage is formed into the sheet 230 for leading through a cavity of a second combinable tip tray and/or for connecting to a pipetting apparatus.

FIG. 10 shows a method of manufacturing 200 a combinable cavity tray. This method differs from the method of FIG. 7 by the additional fourth step of forming at least one aperture in the bottom area of the at least one cavity 240. The steps of providing a sheet of at least one thermosoftening plastic 210, shaping the sheet by thermoforming 220 and forming at least one passage into the sheet 230 are identical.

| Reference Signs | |
|---|---|
| 10 | Combinable cavity tray |
| 11 | First combinable cavity tray |
| 12 | Second combinable cavity tray |
| 20 | Cavity |
| 21 | Pipetting cavity |
| 22 | Opening |
| 23 | Aperture |
| 30 | Passage |
| 40 | Positioning means |
| 41 | Female positioning means |
| 42 | Male positioning means |
| 43 | Positioning rim |
| 44 | Reinforcing means |
| 50 | Fixation means |
| 60 | Multichannel pipetting head |
| 61 | Pipetting tubes |
| 62 | First end with opening for aspirating and/or dispensing |
| 63 | Second end operationally connected to a pressure generating means |
| 64 | Plunger |
| x | Axis |
| 100 | Assembly of combinable cavity trays |
| 110 | Stack of assemblies of combinable cavity trays |
| 200 | Method of manufacturing a combinable cavity tray |
| 210 | Providing a sheet of at least one thermosoftening plastic |
| 220 | Shaping the sheet by thermoforming |
| 230 | Forming at least one passage into the sheet |
| 240 | Forming at least one aperture in the bottom area of the at least one cavity |

The invention claimed is:

1. A combinable cavity tray (10) for liquid handling, the combinable cavity tray (10) comprising:

at least one cavity (20) formed in the combinable cavity tray for receiving a fluid; and at least one passage (30) comprising an aperture formed in the combinable cavity tray for receiving a cavity of another combinable cavity tray and/or for receiving a pipetting tube of a pipetting apparatus, wherein the at least one cavity (20) is formed integrally and extends from the combinable cavity tray (10) and wherein at least a bottom area of the at least one cavity (20) extends outside the at least one passage (30) of a second combinable cavity tray when the at least one passage (30) of the second combinable cavity tray receives the at least one cavity (20).

2. The combinable cavity tray (10) according to claim 1, wherein the at least one cavity (20) is formed by thermo-forming.

3. The combinable cavity tray (10) according to claim 1 made at least in parts of a thermosoftening plastic, or of a compound foil comprising at least one of polyethylene terephthalate (PET), polystyrene (PS), or polypropylene (PP).

4. The combinable cavity tray (10) according to claim 3, wherein the thermosoftening plastic is chosen from the group comprising polyethylene terephthalate (PET), poly-styrene (PS) and polypropylene (PP).

5. The combinable cavity tray (10) according to claim 3, wherein the compound foil is chosen from the group comprising polyethylene terephthalate (PET) and polypropylene (PP).

6. The combinable cavity tray (10) according to claim 1, wherein the at least one cavity (20) is a pipetting cavity (21) with an aperture (23) for aspirating and/or dispensing a fluid.

7. The combinable cavity tray (10) according to claim 1, wherein the at least one cavity (20) is a test tube for analytics and/or diagnostics.

8. The combinable cavity tray (10) according to claim 1, wherein the combinable cavity tray (10) comprises at least one positioning means (41, 42) for guiding an assembling process of assembling a first cavity tray and a second cavity tray and/or at least one fixation means (50) for fixing a first cavity tray and a second cavity tray when assembled.

9. The combinable cavity tray (10) according to claim 1, wherein the at least one cavity (20) and at least one passage (30) are arranged alternating.

10. An assembly (100) of combinable cavity trays comprising at least two combinable cavity trays (10) according to claim 1.

11. An assembly (100) of combinable cavity trays according to claim 10, wherein the total number of cavities (20) is 384, 96 or 48.

12. Method of connecting a combinable cavity tray (10) according to claim 1 or an assembly (100) of combinable cavity trays according to a pipetting apparatus with pipetting tubes (61), the method comprising:

inserting at least one pipetting tube (61) with its first end (62) in a cavity (20) of a combinable cavity tray (10) through the opening (22) of the cavity (20) with a first force to achieve a friction fit between the at least one pipetting tube (61) and the combinable cavity tray (10);

positioning the combinable cavity tray (10) connected to the at least one pipetting tube (61) on a rigid base and further inserting the at least one pipetting tube (61) in the cavity (20) with a second force being stronger than the first force to achieve a fluid-tight connection between the at least one pipetting tube (61) and the cavity (20) of the combinable cavity tray (10).

13. Method of connecting a combinable cavity tray (10) according to claim 1 or an assembly (100) of combinable cavity trays according to a pipetting apparatus with pipetting tubes (61), the method comprising:

inserting at least one pipetting tube (61) with its first end (62) in a cavity (20) of a first combinable cavity tray (11) through the opening (22) of the cavity (20) with a first force to achieve a friction fit between the at least one pipetting tube (61) and the first combinable cavity tray (11);

inserting at least one further pipetting tube (61) with its first end (62) in a cavity (20) of a second combinable cavity tray (12) through the opening (22) of the cavity (20) with a second force to achieve a friction fit between the at least one further pipetting tube (61) and the second combinable cavity tray (12);

positioning the first combinable cavity tray (11) connected to the at least one pipetting tube (61) and the second combinable cavity tray (12) connected to the at least one further pipetting tube (61) on a rigid base and further inserting the at least one pipetting tube (61) and the at least one further pipetting tube (61) in the cavities (20) with a third force being stronger than the first force and the second force to achieve a fluid-tight connection of the at least one pipetting tube (61) and the at least one further pipetting tube (61) to the cavities (20) and to in particular achieve assembling the first combinable cavity tray (11) and the second combinable cavity tray (12) to form an assembly (100) of combinable cavity trays (10).

* * * * *